United States Patent [19]

Yoshida

[11] Patent Number: 4,785,468
[45] Date of Patent: Nov. 15, 1988

[54] INTERMITTENT RECEIVER

[75] Inventor: Osamu Yoshida, Tokyo, Japan

[73] Assignee: NEC Corporation, Japan

[21] Appl. No.: 142,942

[22] Filed: Jan. 12, 1988

[30] Foreign Application Priority Data

Jan. 12, 1987 [JP] Japan ................................. 62-5508

[51] Int. Cl.4 ........................ H04L 27/14; H04L 7/02; H04B 1/18
[52] U.S. Cl. ........................................ 375/75; 375/90; 375/119; 455/343
[58] Field of Search .......................... 375/75, 90, 119; 455/343; 328/119; 340/825.44

[56] References Cited

U.S. PATENT DOCUMENTS

| 3,996,581 | 12/1976 | Brodeur et al. | 455/343 |
| 4,181,893 | 1/1980 | Ehmke | 455/343 |
| 4,340,973 | 7/1982 | Umetsu | 455/343 |
| 4,479,261 | 10/1984 | Oda et al. | 455/343 |

Primary Examiner—Robert L. Griffin
Assistant Examiner—Marianne Huseman
Attorney, Agent, or Firm—Laff, Whitesel, Conte & Saret

[57] ABSTRACT

In intermittent receiver comprises a shift register, a time signal generator including a decoder connected to receive at least a portion of parallel data outputs of the shift register so as to generate a time signal and a delayed detector including an exclusive-OR gate receiving a serial data output of the shift register and a reception signal so as to generate a detection signal. A first selection circuit has one output connected to the serial data input of the shift register and a first input connected to receive a feedback signal from of the time signal generator and a second input connected to receive the reception signal, and a second selection circuit has an output connected to the clock input of the shift register and a pair of inputs connected to receive a pair of different clocks. Further, a controller receives the time signal from the decoder for controlling the conditions of the first and second selection circuits. When the time signal is indicative of a wait mode, one of the clock signals is outputted to the shift register so that the time signal generator operates. When the time signal is brought into a condition indicative of a receptiom mode, the other clock signals is supplied to the shift register and the reception signal is fed to the shift register so that delayed detector operates to execute the delayed detection for the reception signal.

8 Claims, 3 Drawing Sheets

INTERMITTENT RECEIVER

BACKGROUND OF THE INVENTION

1. Field of the invention

The present invention relates to improvement of receivers which are intermittently operated for saving a power consumption of an associated electric battery and, more specifically to such intermittent receivers constituted of a small amount of circuit elements.

2. Description of Related Art

Heretofore, a so-called intermittent receiver is composed of a time signal generator 10 and a delayed detector 12, as shown in FIG. 1. The time generator 10 has a shift register 14 formed of a plurality of cascaded D-type flipflops 16A to 16N, which have respective clock inputs C commonly connected to receive a clock $C_T$. A Q output of the last flipflop 16N and a $\bar{Q}$ output of the penultimated flipflop 16M are connected to an exclusive-OR gate 18, whose output is connected to a data input D of the first flipflop 16A. Each of the flipflops 16A to 16M excluding the final flipflop 16N are connected at their Q outputs to corresponding inputs of a plurality of NOR gates 20 arranged in parallel to each other. A $\bar{Q}$ output of the final flipflop 16N is also connected to one input of one of the NOR gates 20. Outputs of all the NOR gates 20 are connected to inputs of the NAND gate 22, which, in turn, generates an output time pulse $V_T$. Thus, the NOR gates 20 and the NAND gate 22 constitute together a decoder 24 for detecting a predetermined condition of the shift register 14, and therefore, the shift register 14 and the decoder 24 form a frequency divider for frequency-dividing the clock signal $C_T$ by a divisor determined by the number of the flipflops.

The time pulse $V_T$ generated by the time signal generator 10 is supplied to a controller 26, which generates a switching signal $V_S$ for selection between a wait or rest mode and a reception mode. This switching signal $V_S$ is inputted to a power switch circuit 30, which operates to selectively supply an electric power to either the time signal generator 10 or the delayed detector 12.

The delayed detector 12 includes a shift register 32 composed of a plurality of cascaded D-type flipflops 34A to 34S which commonly receive a clock $C_S$ at their respective clock input C. A data input D of the first flipflop 34A constitutes an input of the delayed detector 12 and is connected to receive a reception signal $V_R$. The reception signal $V_R$ and the delayed signal $V_D$ outputted from a Q output of the final flipflop 34S are supplied to a pair of inputs of an exclusive-OR gate 36, whose output generates a detection signal $V_O$ as an output of the delayed detector 12.

With the above arrangement, an electric power is intermittently supplied to the delayed detector 12 for a short continuous time period in the order of several ten milliseconds at constant intervals of several ten seconds to several minutes. For the other times, the electric power is supplied to the time signal generator 10.

Referring to FIG. 2, there is illustrated one example of the switch signal $V_S$ generated by the controller 26. The shown switch signal $V_S$ is a pulse signal having a high level period of $T_1$ which corresponding to the intermittent operation period of the delayed detector 12, namely, the period of the reception mode of the intermittent receiver. In this reception mode, the electric power is supplied to the delayed detector 12 so that the inputted reception signal $V_R$ is delayed and detected by the delayed detector 12. The length of this reception mode is determined by the controller 26. On the other hand, a low level period $T_2$ of the switch signal $V_S$ corresponds to the wait mode in which the electric power is supplied to the time signal generator 10 but not supplied to the delayed detector 12. The length of this low level period $T_2$ is determined by the frequency of the clock $C_T$ and the frequency division ratio determined by cooperation of the shift register 14 and the decoder 24.

More specifically, as shown in FIG. 3, the reception signal $V_R$ is composed of a Minimum Shift Keying signal having such a ratio of frequency that on an assumption that the frequency of a signal portion representative of one bit data of the logic value "1" is 1, the frequency of a signal portion representative of one bit data of the logic value "0" will be 1.5, and the signal portion representative of one bit data of the logic value "1" has a length of one wavelength and the signal portion representative of one bit data of the logic value "0" has a length of one and half wavelength, so that the signal portion representative of one bit data of the logic value "1" and the signal portion representative of one bit data of the logic value "0" have the same length of time. Such a reception signal $V_R$ is obtained by shaping a signal RF transmitted in the form of a radio wave into a pulse signal form, and then inputted to the delayed detector 12. The inputted signal $V_T$ is branched to the shift register 34 and the exclusive-OR gate 36. The signal $V_R$ inputted to the shift register 34 is delayed by the time period corresponding to one bit, and then, is outputted as the delayed signal $V_D$ as shown in FIG. 4 to the input of the exclusive-OR gate 36. Thus, an exclusive-OR between the signals $V_R$ and $V_D$ is effected in the gate 36 and the result of the logical operation is outputted as a detection signal $V_O$.

Thereafter, the detection signal $V_O$ is passed through a lowpass filter (not shown) so that it is converted into a signal $V_F$, which is in turn further shaped to a digital signal DT by means of an appropriate means (not shown).

As will be apparent from the above mentioned description, the conventional intermittent receiver is such that a time signal generator and a delayed detector have independent shift registers, respectively, although these shift registers are alternatively caused to operate. In other words, when one of the two shift registers is in operation, the other shift register is in a non-operation condition. Therefore, the circuit construction is very redundant, and the use efficiency of the circuit elements is low. This would be a one obstacle to integration of the intermittent receiver.

SUMMARY OF THE INVENTION

Accordingly, it is an object of the present invention to provide an intermittent receiver which has overcome the above mentioned defect of the conventional one.

A further object of the present invention is to provide an intermittent receiver composed of a small amount of circuit elements and having a high circuit use efficiency.

A still further object of the present invention is to provide an intermittent receiver which can be assembled on an integrated circuit chip at a high integration density.

The above and other objects of the present invention are achieved in accordance with the present invention by an intermittent receiver comprising:

a shift register including a plurality of cascaded flipflops and having a serial data input, a serial data output, a plurality of parallel data outputs and a clock input;

a time signal generator including a decoder connected at its inputs at least a portion of the parallel data outputs of the shift register so as to generate a time signal and a first gate means receiving at least a portion of the parallel outputs of the shift register so as to generate a feedback signal;

a first selection circuit having one output connected to the serial data input of the shift register and a first input connected to an output of the first gate means and a second input connected to receive a reception signal;

a second selection circuit having an output connected to the clock input of the shift register and a pair of inputs connected to receive a pair of different clocks, respectively;

a delayed detector including a second gate means having a first input connected to the serial data output of the shift register and a second input connected to receive the reception signal so as to generate a detection signal; and control means receiving the time signal outputted from the decoder for controlling the conditions of the first and second selection circuits in such a manner that, when the time signal is indicative of a wait mode, the second selection means outputs one of the clock signals to the shift register and the first selection means outputs the feedback signal to the shift register so that the time signal generator generates a predetermined time signal, and when the time signal is brought into a condition indicative of a reception mode, the second selection means outputs the other clock signals to the shift register and the first selection means outputs the reception signal to the shift register so that delayed detector operates to execute the delayed detection for the reception signal.

In a preferred embodiment of the intermittent receiver, the control means responds to the time signal outputted from the decoder to control the power supply to the time signal generator and the delayed detector in such a manner that, when the time signal is indicative of the wait mode, an electric power is supplied to the time signal generator and when the time signal is brought into a condition indicative of the reception mode, the power supply to the time signal generator is stopped and an electric power is supplied to the delayed detector.

Specifically, the controlling means includes a controller receiving the time signal for generating a switch signal having a predetermined time period when the time signal is brought into a condition indicative of the reception mode, and a power switch circuit receiving the switch signal for selectively supplying the electric power to the time signal generator when the switch signal is indicative of the wait mode and to the delayed detector when the switch signal is indicative of the reception mode.

Further, each of the flipflops is composed of a D-type flipflop having a data input, a clock input and Q and $\bar{Q}$ outputs, these flipflops being cascade-connected in such manner that each of the flipflops is connected at its Q output to a data input of the downstream adjacent flipflop.

In addition, the decoder includes a plurality of NOR gates arranged in parallel to receive at their respective inputs the Q outputs of the D-type flipflops contained in a group consisting of a portion of the D-type flipflops and a Q output of a flipflop downstreamly adjacent to the group of flipflops, and a NAND gate receiving respective outputs of the NOR gates so as to generate the above mentioned time signal.

In a specific embodiment, the first gate means includes an exclusive-OR gate receiving at its pair of inputs the Q output of the final stage D-type flipflop contained in the group of D-type flipflops and a Q output of a flipflop downstreamly adjacent to the first group of flipflops. Further, the second gate means includes an exclusive-OR gate receiving at its pair of inputs the reception signal and the Q output of the final stage D-type flipflop of the shift register.

The above and other objects, features and advantages of the present invention will be apparent from the following description of a preferred embodiment of the invention with reference to the accompanying drawings.

DESCRIPTION OF THE PREFERRED EMBODIMENT

Figure 1:
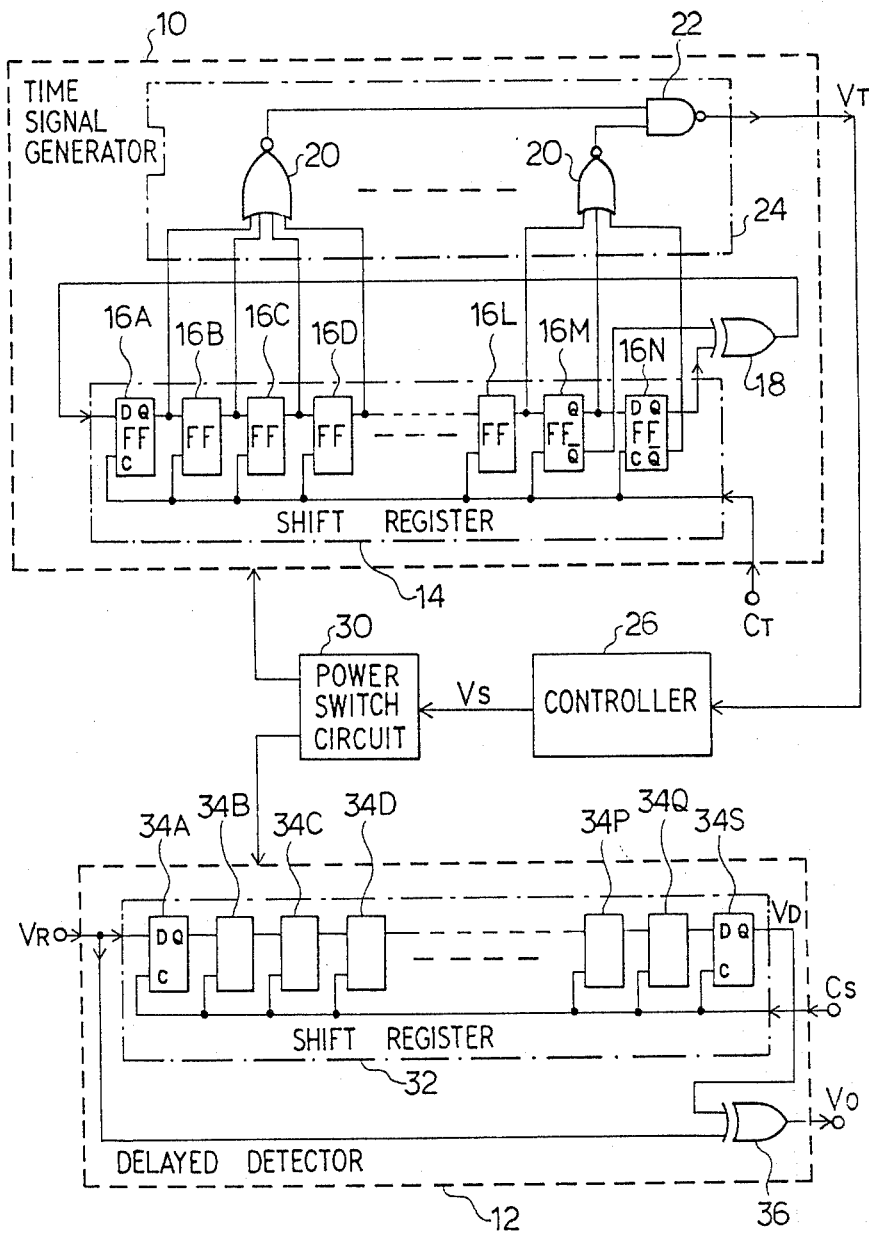
FIG. 1 is a block diagram showing one example of the conventional intermittent receiver.
Figure 2:
FIG. 2 is a waveform chart of the switch signal generated in the intermittent receiver.
Figure 4:
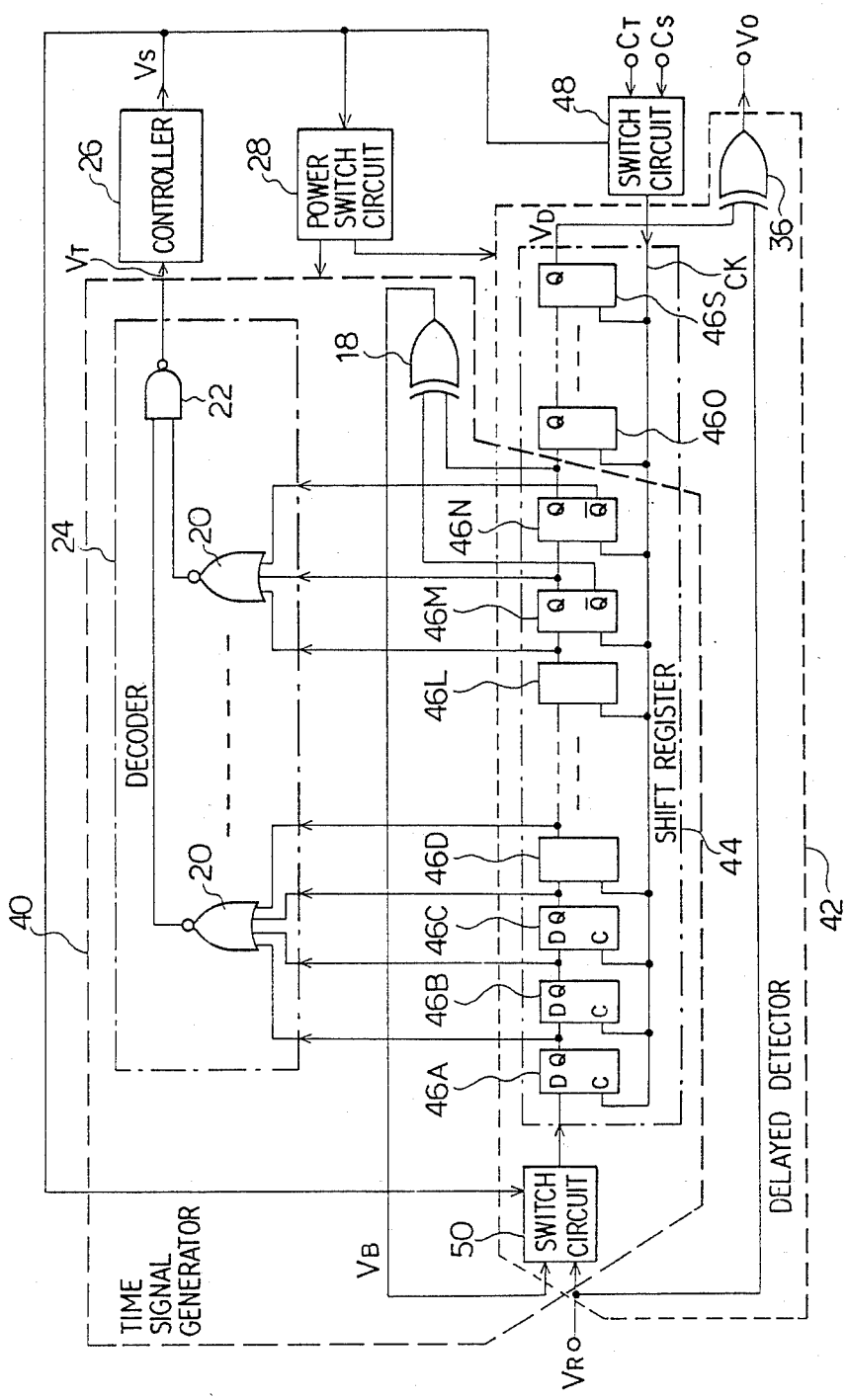
FIG. 4 is a diagram similar to FIG. 1 but illustrating one embodiment of the intermittent receiver in accordance with the present invention.

Referring to FIG. 4, there is shown one embodiment of the intermittent receiver in accordance with the present invention, which is composed of a time signal generator 40 and a delayed detector 42 having a shift register 44 common to each other. In FIG. 4, circuit elements similar to those shown in FIG. 1 are given the same Reference Numerals and explanation thereof will be omitted.

The shift register 44 is formed of a plurality of cascaded D-type flipflops 46A to 46S in such a manner that each of the flipflops is connected at its Q output to a data input D of the downstream adjacent flipflop. The flipflops 46A to 46S are connected at their respective clock inputs C commonly to receive a clock CK from a switch circuit 48, which receive two kinds of clock signals $C_T$ and $C_S$. A data input of the first flipflop 46A is connected to receive an output of another switch circuit 50.

A Q output of an intermediate stage flipflop 16N of the cascaded flipflops 46A to 46S and a $\bar{Q}$ output of a flipflop 16M just before the flipflop 46N are connected to an exclusive-OR gate 18, whose output is connected as a feedback signal $V_B$ to one input of the switch circuit 50. Each of the flipflops 46A to 46M are connected at their Q outputs to corresponding inputs of a plurality of NOR gates 20 arranged in parallel to each other. A $\bar{Q}$ output of the flipflop 46N is also connected to one input of one of the NOR gates 20. Outputs of all the NOR gates 20 are connected to inputs of a NAND gate 22, which generates an output time pulse $V_T$ of a decoder 24, which is composed of the NOR gates 20 and the NAND gate 22. Thus, the time signal generator 40 is constituted of the flipflops 46A to 46N, the decoder 40, the exclusive-OR gate 18 and the switch circuit 50. Namely, the flipflops 46A to 46N of the shift register 44 are used for forming a portion of the time signal generator 40.

The time pulse $V_T$ thus generated is supplied to a controller 26, which generates a switching signal $V_T$ for selection between a wait or rest mode and a reception mode. This switching signal $V_S$ is inputted to a power switch circuit 30 and the switch circuits 48 and 50. The power switch circuit 28 operates to selectively supply an electric power to either the time signal generator 40 or the delayed detector 42.

The delayed detector 42 has an exclusive OR gate 36 receiving at its one input a Q output of the final flipflop 46S and at its other input directly an reception signal $V_R$. The exclusive-OR gate 36 generates at its output a detection signal $V_O$ as an output of the delayed detector 42. Further, the reception signal $V_R$ is inputted to the other input of the switch circuit 50. Thus, the delayed detector 42 is constituted of all the flipflops 46A to 46S, the exclusive-OR gate 36 and the switch circuit 50. Namely, all the flipflops 46A to 46S of the shift register 44 are used to a portion of the delayed detector 42.

With the above mentioned arrangement, when the switch signal $V_S$ is indicative of the wait mode, i.e., at a low level, the power switch circuit 28 supplies the power to the decoder 24 and the flipflops 46A to 46N. On the other hand, when the switch signal $V_S$ is indicative of the reception mode, i.e., at a high level, the power switch circuit 28 supplies the power to the exclusive OR gate 36 and the flipflops 46A to 46S. Further, the controller 26, the power switch circuit 28 and the switch circuits 48 and 50 are ceaselessly supplied with a necessary electric power.

In addition, when the switch signal $V_S$ is at a low level corresponding to the period $T_2$ i.e., when the receiver is in the wait mode, the switch circuit 48 responds to the switch signal $V_S$ so as to output the clock signal $C_T$ to the shift register 44 as the common clock CK and the switch circuit 50 responds to the switch signal $V_S$ so as to output the feedback signal $V_B$ to the shift register 44 as the data signal. On the other hand, when the switch signal $V_S$ is at a high level corresponding to the period $T_1$ i.e., when the receiver is in the reception mode, the switch circuit 48 responds to the switch signal $V_S$ so as to output the clock signal $C_S$ to the shift register 44 as the common clock CK and the switch circuit 50 responds to the switch signal $V_S$ so as to output the reception signal $V_R$ to the shift register 44 as the data signal.

Thus, the above mentioned intermittent receiver will operates as follows:

When the switch signal $V_S$ is indicative of the wait mode, the power switch circuit 28 operates to supply the electric power to the decoder 24 and the flipflops 46A to 46N. Further, the switch circuit 48 outputs the clock signal $C_T$ to the shift register 44 as the common clock CK and the switch circuit 50 outputs the feedback signal $V_B$ to the shift register 44 as the data signal. Accordingly, the flipflops 46A to 46N and the decoder 44 cooperate to frequency-divide the clock signal $C_T$ so as to generate the time signal $V_T$ when the time $T_2$ determined by the number of the flipflops 46A to 46N and the repetition frequency of the clock signal $C_T$ has elapsed from the moment the circuit is brought into the wait mode. In response to the time signal $V_T$, the controller 26 generates the switch signal $V_S$ having the high level of the period $T_1$, with the result that the circuit is brought into the reception mode.

When the switch signal $V_S$ is brought into a high level indicative of the reception mode, the power switch circuit 28 stops the power supply to the decoder 24 and the exclusive-OR gate 18, and supplies the power to the exclusive-OR gate 36 and all the flipflops 46A to 46S. In addition, the switch circuit 48 outputs the clock signal $C_S$ to the shift register 44 as the common clock CK, and the switch circuit 50 outputs the reception signal $V_R$ to the shift register 44 as the data signal.

Figure 3:
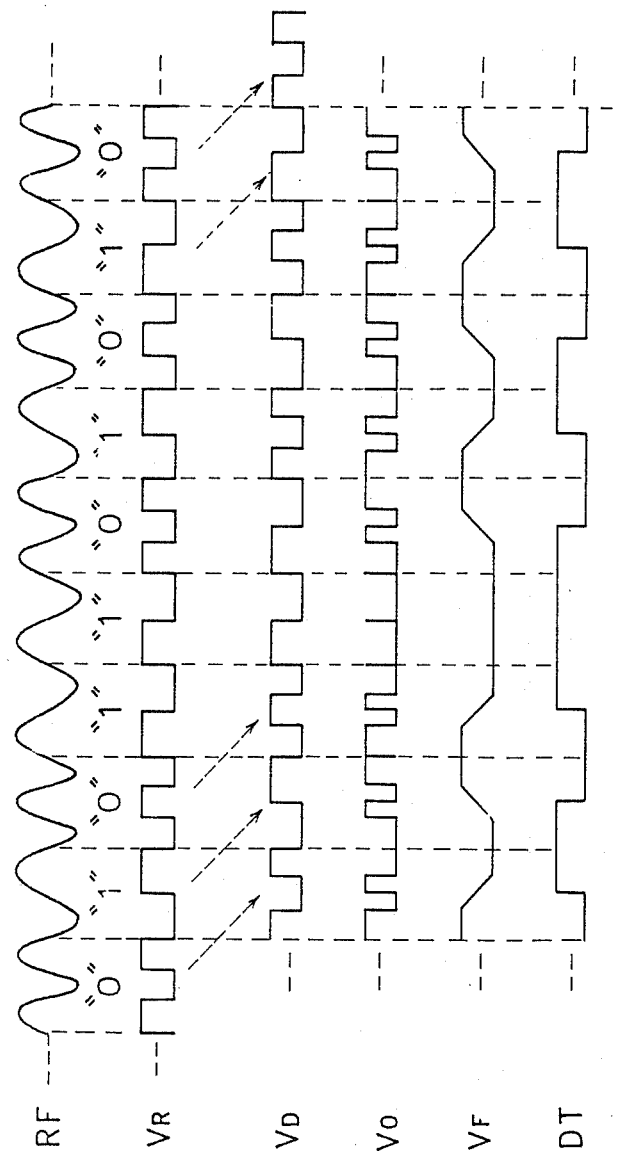
FIG. 3 is a waveform chart illustrating the signal processing carried out in the delayed detector and others included in the intermittent receiver.

In this reception mode, the reception signal $V_R$ is inputted through the switch circuit 50 to the shift register 44 where the reception signal $V_R$ is delayed by a time corresponding to the length of one bit data by means of the cascaded flipflops 46A to 46S. The signal $V_R$ thus delayed by the shift register 34 is outputted as the delayed signal $V_D$ to the one input of the exclusive-OR gate 36, which also directly receives at its other input the non-delayed reception signal $V_R$. Thus, an exclusive-OR between the signals $V_R$ and $V_D$ is effected in the gate 36 and the result of the logical operation is outputted as a detection signal $V_O$. Thereafter, the detection signal $V_O$ is passed through a lowpass filter (not shown) so that it is converted into a signal $V_F$ as shown in FIG. 3, which is in turn further shaped to a signal DT as shown FIG. 3 by means of an appropriate means (not shown).

After the high level period $T_1$ of the switch signal $V_S$ has elapsed, the switch signal $V_S$ is returned to the low level so that the receiver is put in the wait mode. Thus, the power switch circuit 28 operates to supply the electric power to the decoder 24, the exclusive-OR gate 18 and the flipflops 46A to 46N, again. Further, the switch circuit 48 outputs the clock signal $C_T$ to the shift register 44 as the common clock CK, and the switch circuit 50 outputs the feedback signal $V_B$ to the shift register 44 as the data signal. Accordingly, the above mentioned wait mode operation is repeated, and thereafter the reception mode operation is carried out, again. Thus, the wait mode operation and reception mode operation are alternatively executed while utilizing the same shift register 44 in both the two modes.

As will be apparent from the above mentioned description, the embodiment of the present invention comprises a shift register used commonly to the time signal generator and the delayed detector, and therefore, does not require one independent shift register for each of the time signal generator and the delayed detector. Thus, the shown embodiment is free of a redundant circuit, and so can be assembled on an integrated circuit chip at a high integration density.

In the above mentioned embodiment, the time of the wait mode is determined by the number of the flipflops 46A to 46N and the pulse repetition frequency of the clock $C_T$, and the delay time corresponding to the one bit data is determined by the number of the flipflops 46A to 46S and the pulse repetition frequency of the clock $C_S$. Therefore, if the pulse repetition frequencies of the clocks $C_T$ and $C_S$ are determined to appropriate values, the same number of flipflops in the shift register can be used for each of the time signal generator and the delayed detector.

The invention has thus been shown and described with reference to the specific embodiment. However, it should be noted that the present invention is in no way limited to the details of the illustrated structures but changes and modifications may be made within the scope of the appended claims.

What is claimed is:

1. An intermittent receiver comprising:
   a shift register including a plurality of cascaded flipflops and having a serial data input, a serial data output, a plurality of parallel data outputs and a clock input;
   a time signal generator including a decoder, connected at its inputs at least a portion of the parallel data outputs of the shift register so as to generate a time signal and a first gate means receiving at least a portion of the parallel outputs of the shift register so as to generate a feedback signal;
   a first selection circuit having one output connected to the serial data input of the shift register and a first input connected to an output of the first gate means and a second input connected to receive a reception signal;
   a second selection circuit having an output connected to the clock input of the shift register and a pair of inputs connected to receive a pair of different clocks, respectively;
   a delayed detector including a second gate means having a first input connected to the serial data output of the shift register and a second input connected to receive the reception signal so as to generate a detection signal; and
   control means receiving the time signal outputted from the decoder for controlling the conditions of the first and second selection circuits in such a manner that, when the time signal is indicative of a wait mode, the second selection means outputs one of the clock signals to the shift register and the first selection means outputs the feedback signal to the shift register so that the time signal generator generates a predetermined time signal, and when the time signal is brought into a condition indicative of a reception mode, the second selection means outputs the other clock signals to the shift register and the first selection means outputs the reception signal to the shift register so that delayed detector operates to execute the delayed detection for the reception signal.

2. An intermittent receiver claimed in claim 1 wherein the decoder includes a plurality of NOR gates arranged in parallel to receive at their respective inputs the above mentioned at least one portion of the parallel data outputs of the shift register, and a NAND gate receiving respective outputs of the NOR gates so as to generate the above mentioned time signal.

3. An intermittent receiver claimed in claim 1 wherein the control means responds to the time signal outputted from the decoder to control a power supply to the time signal generator and the delayed detector in such a manner that, when the time signal is indicative of the wait mode, an electric power is supplied to the time signal generator and when the time signal is brought into a condition indicative of the reception mode, the power supply to the time signal generator is stopped and an electric power is supplied to the delayed detector.

4. An intermittent receiver claimed in claim 3 wherein the controlling means includes a controller receiving the time signal for generating a switch signal having a predetermined time period when the time signal is brought into a condition indicative of the reception mode, and a power switch circuit receiving the switch signal for selectively supplying the electric power to the time signal generator when the switch signal is indicative of the wait mode and to the delayed detector when the switch signal is indicative of the reception mode.

5. An intermittent receiver claimed in claim 4 wherein each of the flipflops is composed of a D-type flipflop having a data input, a clock input and Q and $\overline{Q}$ outputs, these flipflops being cascade-connected in such manner that each of the flipflops is connected at its Q output to a data input of the downstream adjacent flipflop.

6. An intermittent receiver claimed in claim 5 wherein the decoder includes a plurality of NOR gates arranged in parallel to receive at their respective inputs the Q outputs of the D-type flipflops contained in a group consisting of a portion of the D-type flipflops and a $\overline{Q}$ output of a flipflop downstreamly adjacent to the group of flipflops, and a NAND gate receiving respective outputs of the NOR gates so as to generate the above mentioned time signal.

7. An intermittent receiver claimed in claim 6 wherein the first gate means includes an exclusive-OR gate receiving at its pair of inputs the $\overline{Q}$ output of the final stage D-type flipflop contained in the group of D-type flipflops and a Q output of a flipflop downstreamly adjacent to the first group of flipflops.

8. An intermittent receiver claimed in claim 7 wherein the second gate means includes an exclusive-OR gate receiving at its pair of inputs the reception signal and the Q output of the final stage D-type flipflop of the shift register.

* * * * *